United States Patent
Shirai (10) Patent No.: US 10,381,729 B2
(45) Date of Patent: Aug. 13, 2019

(54) ANTENNA SUBSTRATE AND IMAGE FORMING APPARATUS

(71) Applicant: KYOCERA Document Solutions Inc., Osaka-shi, Osaka (JP)

(72) Inventor: Wataru Shirai, Osaka (JP)

(73) Assignee: KYOCERA Document Solutions Inc., Osaka-shi, Osaka (JP)

( * ) Notice: Subject to any disclaimer, the term of this patent is extended or adjusted under 35 U.S.C. 154(b) by 0 days.

(21) Appl. No.: 15/933,767

(22) Filed: Mar. 23, 2018

(65) Prior Publication Data

US 2018/0287256 A1    Oct. 4, 2018

(30) Foreign Application Priority Data

Mar. 30, 2017   (JP) ................... 2017-069063

(51) Int. Cl.
| | |
|---|---|
| *H01Q 7/00* | (2006.01) |
| *H04B 5/00* | (2006.01) |
| *H01Q 7/06* | (2006.01) |
| *H01Q 1/22* | (2006.01) |
| *H01Q 1/38* | (2006.01) |

(52) U.S. Cl.
CPC .......... *H01Q 7/005* (2013.01); *H01Q 1/2225* (2013.01); *H01Q 7/06* (2013.01); *H04B 5/00* (2013.01); *H04B 5/0056* (2013.01); *H04B 5/0081* (2013.01); *H01Q 1/38* (2013.01)

(58) Field of Classification Search
CPC ............ H01Q 1/38; H01Q 7/00; H01Q 7/005; H01Q 7/06; H01Q 1/2225; H04B 5/00; H04B 5/0056; H04B 5/0081
See application file for complete search history.

(56) References Cited

U.S. PATENT DOCUMENTS

| | | | |
|---|---|---|---|
| 7,198,198 B2* | 4/2007 | Akiho | G06K 7/10316 235/492 |
| 7,336,243 B2* | 2/2008 | Jo | G06K 19/0726 340/572.7 |

(Continued)

FOREIGN PATENT DOCUMENTS

| | | |
|---|---|---|
| JP | 2004206736 A | 7/2004 |
| JP | 2008078965 A | 4/2008 |
| JP | 2014146968 A | 8/2014 |

OTHER PUBLICATIONS

Japanese Patent Office, Office Action Issued in Application No. 2017069063, dated May 14, 2019, 4 pages.

*Primary Examiner* — Tho G Phan
(74) *Attorney, Agent, or Firm* — Alleman Hall Creasman & Tuttle LLP (57) ABSTRACT

An antenna substrate includes a substrate, a modulation/demodulation circuit, a printed antenna, a first switch circuit, and a second switch circuit. The printed antenna printed on the substrate includes a plurality of unit coils. The first switch circuit selectively switches to a state where a part or all of the plurality of unit coils are selectively and electrically connected in series, or a state where a part or all of the plurality of unit coils are electrically disconnected, in accordance with a first control signal inputted to the first switch circuit. The second switch circuit selectively and electrically connects a first end of any one of the plurality of unit coils to the modulation/demodulation circuit in accordance with a second control signal inputted to the second switch circuit.

9 Claims, 5 Drawing Sheets

(56) References Cited

U.S. PATENT DOCUMENTS

| | | | |
|---|---|---|---|
| 7,580,675 B2* | 8/2009 | Kuriki | H04B 5/0056 |
| | | | 340/10.4 |
| 8,503,931 B2* | 8/2013 | Wilson | G06K 19/0723 |
| | | | 235/451 |
| 8,843,095 B2* | 9/2014 | Nakayama | H04B 5/0081 |
| | | | 455/277.1 |
| 2007/0205291 A1* | 9/2007 | Aramaki | G06K 19/07749 |
| | | | 235/492 |
| 2010/0103055 A1 | 4/2010 | Waku et al. | |
| 2010/0214187 A1* | 8/2010 | Sugita | G06K 19/07749 |
| | | | 343/788 |
| 2015/0346039 A1* | 12/2015 | Ito | G06K 19/0717 |
| | | | 374/117 |

* cited by examiner

ANTENNA SUBSTRATE AND IMAGE FORMING APPARATUS

INCORPORATION BY REFERENCE

This application is based upon and claims the benefit of priority from the corresponding Japanese Patent Application No. 2017-069063 filed on Mar. 30, 2017, the entire contents of which are incorporated herein by reference.

BACKGROUND

Generally, an image forming apparatus includes a unit mounting portion capable of mounting/detaching a supply unit containing a developer. Furthermore, the image forming apparatus may include a tag reader that performs short-range wireless communication with an electronic tag through an antenna. The tag reader includes the antenna for short-range wireless communication.

Generally, the antenna is a coil antenna composed of a metal foil printed in a coil shape on a substrate. The substrate is provided to the unit mounting portion. Meanwhile, the electronic tag is mounted on the supply unit. The tag reader reads, for example, information about the color, the type, and the like of the developer from the electronic tag.

In addition, when the distance between the antenna and the electronic tag is short, an auxiliary antenna for reducing the resonance frequency of the electronic tag is known to be mounted to the supply unit.

SUMMARY

An antenna substrate according to an aspect of the present disclosure includes a substrate, a modulation/demodulation circuit, a printed antenna, a first switch circuit, and a second switch circuit. The modulation/demodulation circuit is mounted on the substrate and configured to output and receive a communication signal to be used for short-range wireless communication with an electronic tag. The printed antenna is printed on the substrate and configured to transmit and receive the communication signal as a radio wave. The printed antenna includes a plurality of unit coils that are each a metal foil printed in a coil shape on the substrate. The first switch circuit is mounted on the substrate. The first switch circuit selectively switches to a state where a part or all of the plurality of unit coils are selectively and electrically connected in series, or a state where a part or all of the plurality of unit coils are electrically disconnected, in accordance with a first control signal inputted to the first switch circuit. The second switch circuit is mounted on the substrate. The second switch circuit selectively and electrically connects a first end of any one of the plurality of unit coils to the modulation/demodulation circuit in accordance with a second control signal inputted to the second switch circuit.

An image forming apparatus according to another aspect of the present disclosure includes a unit mounting portion, the above antenna substrate, and a processor. The unit mounting portion is a portion capable of mounting and detaching a supply unit containing a developer. The antenna substrate is provided in corresponding relation to the unit mounting portion. The processor is configured to output the first control signal and the second control signal to the first switch circuit and the second switch circuit of the antenna substrate. Furthermore, the processor is configured to read information from an electronic tag mounted on the supply unit that is mounted on the unit mounting portion, by the short-range wireless communication through the printed antenna of the antenna substrate.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Hereinafter, embodiments of the present disclosure will be described with reference to the accompanying drawings. It should be noted that the following embodiments are examples embodying the present disclosure and do not limit the technical scope of the present disclosure.

First Embodiment

An image forming apparatus 10 according to a first embodiment is an apparatus that executes a print process of forming an image on a sheet. The sheet is a sheet-like image formation medium such as paper or an envelope.

Figure 1:
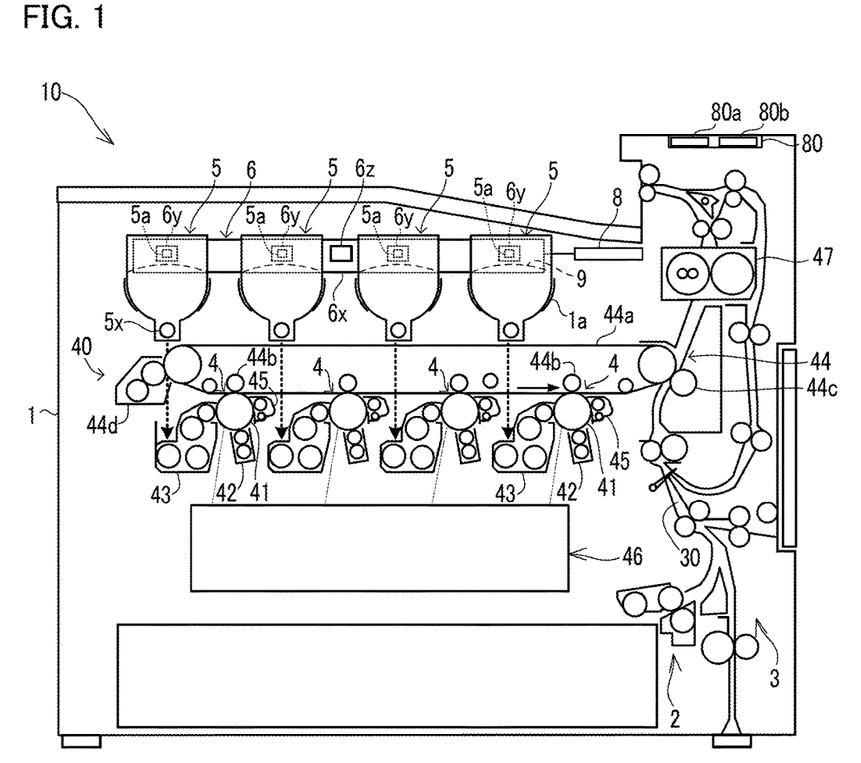
FIG. 1 is a configuration diagram of an image forming apparatus according to a first embodiment.

As shown in FIG. 1, the image forming apparatus 10 includes a sheet supply mechanism 2, a sheet conveyance mechanism 3, an image forming portion 40, a control portion 8, etc. in a main body 1. Furthermore, an operation display portion 80 is mounted on the outer surface of the main body 1.

The image forming portion 40 is a device that executes the print process by electrophotography. In this case, the image forming portion 40 includes image creating portions 4, an optical scanning portion 46, a transfer device 44, and a fixing device 47. Each image creating portion 4 includes a photosensitive member 41, a charging device 42, a developing device 43, a photosensitive member cleaning device 45, etc.

The image forming apparatus 10 shown in FIG. 1 is a color image forming apparatus including the image forming portion 40 that is of a tandem type. Thus, the image forming portion 40 includes four image creating portions 4 corresponding to cyan, magenta, yellow, and black.

Furthermore, the transfer device 44 includes an intermediate transfer belt 44a, four primary transfer devices 44b corresponding to the four image creating portions 4, a secondary transfer device 44c, and a belt cleaning device 44d.

The sheet supply mechanism 2 sends the sheet to a conveyance path 30. The sheet conveyance mechanism 3 conveys the sheet along the conveyance path 30.

The intermediate transfer belt 44a and the drum-shaped photosensitive member 41 of each image creating portion 4 are rotationally driven by a drive mechanism that is not shown. Each charging device 42 uniformly charges the surface of the photosensitive member 41. The optical scanning portion 46 writes an electrostatic latent image on the surface of each photosensitive member 41.

The developing device 43 develops the electrostatic latent image on the surface of each photosensitive member 41 with a developer 9. Accordingly, an image of the developer 9 is formed on the surface of each photosensitive member 41. The developer 9 in the present embodiment is toner.

Each primary transfer device 44b transfers the image of the developer 9 on the surface of the photosensitive member 41 to the intermediate transfer belt 44a. Accordingly, the images of the developers 9 of the four colors are formed as a color image on the intermediate transfer belt 44a. Each photosensitive member cleaning device 45 removes the developer 9 remaining on the surface of the photosensitive member 41.

The secondary transfer device 44c transfers the images of the developers 9 on the intermediate transfer belt 44a onto the sheet being conveyed along the conveyance path 30. The fixing device 47 heats the images of the developers 9 transferred onto the sheet, thereby fixing the images of the developers 9 on the sheet. The belt cleaning device 44d removes the developers 9 remaining on the intermediate transfer belt 44a.

The image forming apparatus 10 further includes four supply units 5 containing developers 9 of different colors. The four supply units 5 are capable of being mounted on and detached from four unit mounting portions 1a provided in the main body 1.

The four supply units 5 supply the developers 9 to the four developing devices 43, respectively. Each supply unit 5 includes a supply screw 5x that is rotationally driven by a drive mechanism that is not shown. When the supply screw 5x rotates, the developer 9 is supplied from the supply unit 5 to the developing device 43.

The operation display portion 80 is a user interface device that includes an operation portion 80a and a display portion 80b. The operation portion 80a includes a touch panel or operation buttons that receive user operations, etc. The display portion 80b includes a display panel such as a liquid crystal display panel capable of displaying information.

The control portion 8 controls electric devices in the image forming apparatus 10. For example, the control portion 8 includes a CPU (Central Processing Unit), a main storage portion such as a RAM (Random Access Memory), a secondary storage portion, a communication interface, etc.

The CPU executes various types of data processing and control of the electric devices by executing programs stored in advance in the secondary storage portion.

The main storage portion primarily stores programs to be executed by the CPU, and data to be processed by the CPU. The secondary storage portion is a computer-readable non-volatile storage unit. For example, the secondary storage portion may be a flash memory or the like.

The communication interface is a communication device that performs data communication with an external apparatus such as an information processing apparatus. For example, the communication interface may receive print job data from the information processing apparatus.

The control portion 8 may be realized by another processor such as a DSP (Digital Signal Processor) or a circuit such as an ASIC (Application Specific Integrated Circuit).

Electronic Tag 5a

An electronic tag 5a is mounted on each supply unit 5. The electronic tag 5a is a passive type electronic tag. For example, the electronic tag 5a may be a passive type RF (Radio Frequency) tag.

Figure 2:
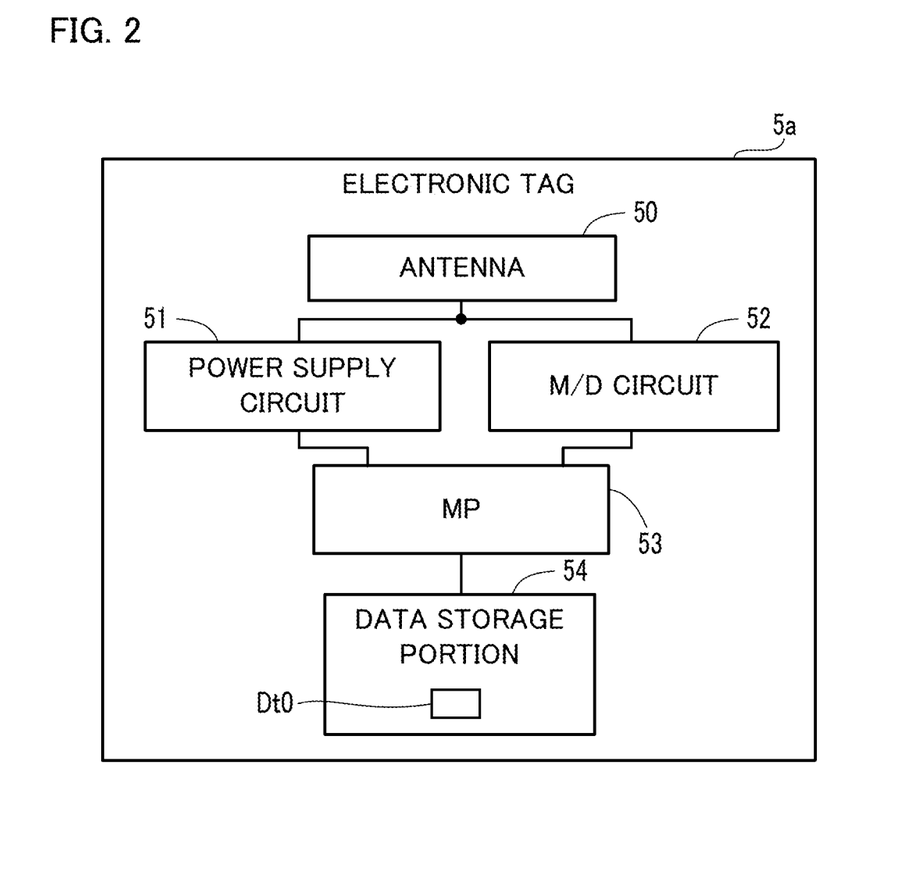
FIG. 2 is a block diagram of an electronic tag mounted on a supply unit.

As shown in FIG. 2, the electronic tag 5a includes an antenna 50 for short-range wireless communication, a power supply circuit 51, a modulation/demodulation circuit 52, a microprocessor 53, and a computer-readable non-volatile data storage portion 54.

The data storage portion 54 is, for example, a flash memory or the like. Tag data Dt0 including information about the developer 9 such as the color and the type of the developer 9 within the supply unit 5 is stored in advance in the data storage portion 54 of the electronic tag 5a. The tag data Dt0 may further include unique unit identification data for each supply unit 5.

The power supply circuit 51 rectifies a reception signal received by the antenna 50 and applies a DC voltage to the microprocessor 53. The modulation/demodulation circuit 52 demodulates the reception signal received by the antenna 50 and transmits reception data resulting from the demodulation, to the microprocessor 53. Furthermore, the modulation/demodulation circuit 52 modulates transmission data outputted by the microprocessor 53 and transmits a transmission signal resulting from the modulation, to the antenna 50. The transmission signal is outputted as a transmission radio wave from the antenna 50.

The microprocessor 53 performs data communication with a tag communication circuit 6y of a later-described antenna substrate 6 through the antenna 50 and a modulation/demodulation circuit 62.

Specifically, when the microprocessor 53 receives a read command from the tag communication circuit 6y, the microprocessor 53 transmits data stored in the data storage portion 54, to the tag communication circuit 6y. Furthermore, when the microprocessor 53 receives a write command and data from the tag communication circuit 6y, the microprocessor 53 causes the data storage portion 54 to store the received data therein.

Outline of Antenna Substrate 6

The image forming apparatus 10 further includes the antenna substrate 6. The antenna substrate 6 is a so-called tag reader/writer that executes transmission and reception of data to and from the electronic tag 5a by the short-range wireless communication.

The antenna substrate 6 includes a substrate 6x and the tag communication circuit 6y provided on the substrate 6x. As will be described later, the tag communication circuit 6y includes: a wiring pattern that is a metal foil printed on the substrate 6x; and a semiconductor element mounted on the substrate 6x. The substrate 6x is a plate-shaped insulator.

The tag communication circuit 6y is provided in corresponding relation to each unit mounting portion 1a. Therefore, the antenna substrate 6 in the present embodiment includes four tag communication circuits 6y.

In the present embodiment, the antenna substrate 6 further includes a microprocessor 6z mounted on the substrate 6x.

The microprocessor 6z is electrically connected to the four tag communication circuits 6y.

The microprocessor 6z reads the tag data Dt0 from the electronic tag 5a and writes data to the electronic tag 5a by performing the short-range wireless communication with the electronic tag 5a through the tag communication circuit 6y. The microprocessor 6z executes communication with the electronic tag 5a in accordance with a communication command from the control portion 8.

When the supply unit 5 is mounted on the unit mounting portion 1a, the electronic tag 5a mounted on the supply unit 5 is present within the area of the short-range wireless communication of the tag communication circuit 6y. In this state, the microprocessor 6z can transmit data to the electronic tag 5a and can receive data from the electronic tag 5a.

Incidentally, after the image forming apparatus 10 is designed and produced, electronic tags 5a having specifications different from the initial specifications may be adopted for the supply units 5 due to various reasons. For example, one of the reasons may be that the specifications for the electronic tags 5a are changed, or that it becomes difficult to procure the initial electronic tags 5a.

In a conventional apparatus, a tag reader may become unable to perform favorable communication with an electronic tag 5a having new specifications. In this case, it is necessary to replace the antenna of the tag reader with another antenna having a different winding number. However, it is difficult to replace the antenna of an apparatus that has already been put on the market.

Meanwhile, in the image forming apparatus 10, even when the specifications for the electronic tags 5a to be mounted on the supply units 5, which contain the developers 9, are changed, the antenna substrate 6 can favorably perform the short-range wireless communication with electronic tags 5a having new specifications without replacing the antenna.

Details of Antenna Substrate 6

Figure 3:
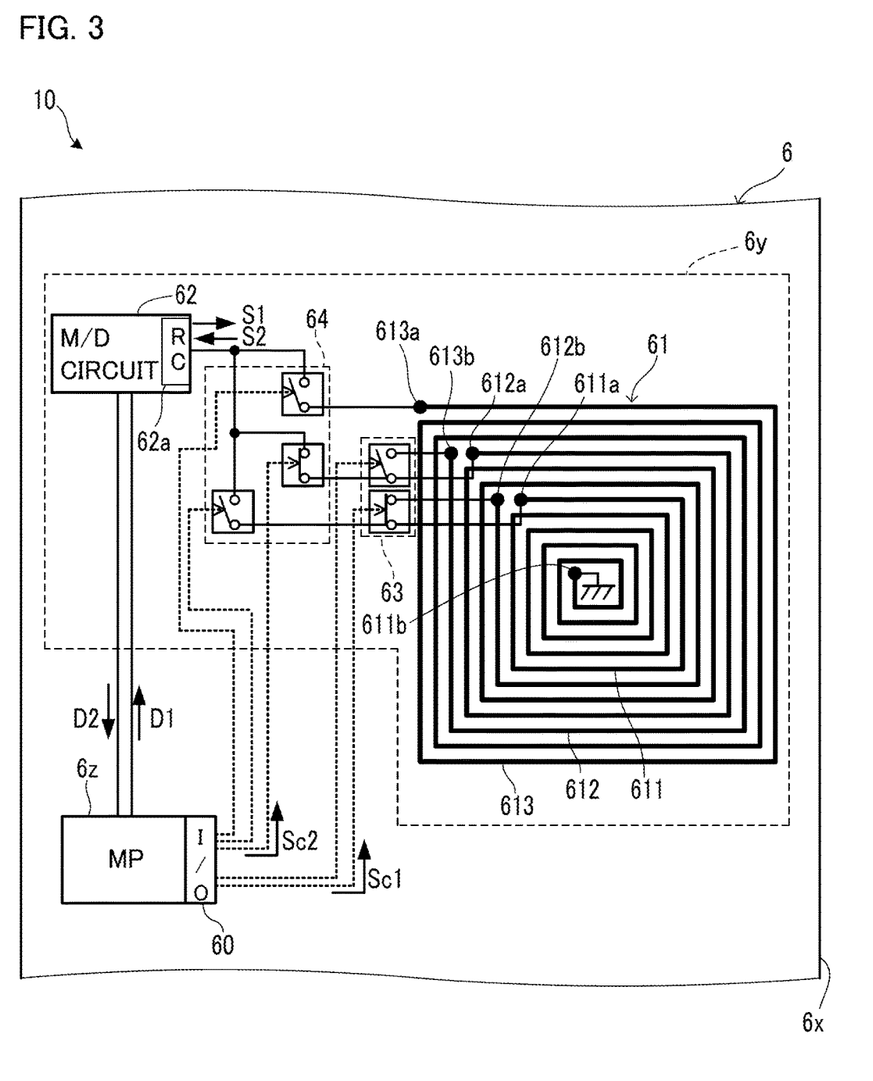
FIG. 3 is a configuration diagram of a tag communication circuit and a microprocessor in an antenna substrate included in the image forming apparatus according to the first embodiment.

As shown in FIG. 3, each tag communication circuit 6y of the antenna substrate 6 includes a printed antenna 61, the modulation/demodulation circuit 62, a first switch circuit 63, and a second switch circuit 64. Each of the modulation/demodulation circuit 62, the first switch circuit 63, and the second switch circuit 64 includes a plurality of semiconductor elements mounted on the substrate 6x.

The modulation/demodulation circuit 62 outputs and receives communication signals S1 and S2 to be used for the short-range wireless communication with the electronic tag 5a. The communication signals S1 and S2 include a transmission signal S1 and a reception signal S2.

The modulation/demodulation circuit 62 modulates transmission data D1 outputted by the microprocessor 6z and transmits the transmission signal S1 resulting from the modulation, to the printed antenna 61 through the second switch circuit 64. The transmission signal S1 is outputted as a transmission radio wave from the printed antenna 61.

Furthermore, the modulation/demodulation circuit 62 demodulates the reception signal S2 received by the printed antenna 61 and transmits reception data D2 resulting from the demodulation, to the microprocessor 6z. The modulation/demodulation circuit 62 receives the reception signal S2 through the second switch circuit 64.

The printed antenna 61 is printed on the substrate 6x, transmits the transmission signal Si as a radio wave, and receives the reception signal S2 as a radio wave. The printed antenna 61 includes a plurality of unit coils 611, 612, and 613 that are each a metal foil printed in a coil shape on the substrate 6x. For example, the unit coils 611, 612, and 613 may be copper foils printed on the substrate 6x.

The printed antenna 61 shown in FIG. 3 includes three unit coils 611, 612, and 613. The number of the plurality of unit coils included in the printed antenna 61 may be two or may be four or more.

In the present embodiment, the plurality of unit coils 611, 612, and 613 are concentrically formed along a series of coil-shaped lines so as to be arranged from the inner side to the outer side.

In the present embodiment, of the three unit coils 611, 612, and 613, the first one, the second one, and the third one from the inner side are referred to as first unit coil 611, second unit coil 612, and third unit coil 613, respectively.

Furthermore, the outer ends of the three unit coils 611, 612, and 613 are referred to as first ends 611a, 612a, and 613a, and the inner ends of the three unit coils 611, 612, and 613 are referred to as second ends 611b, 612b, and 613b. In the present embodiment, the second end 611b of the first unit coil 611 is grounded.

The first switch circuit 63 selectively switches to any of a partial connection state, a full connection state, and a disconnection state in accordance with a first control signal Sc1 inputted to the first switch circuit 63.

The partial connection state is a state where a part of the plurality of unit coils 611, 612, and 613 are electrically connected in series. In the present embodiment, the partial connection state includes at least a state where only the first unit coil 611 and the second unit coil 612 are electrically connected in series.

The state of the first switch circuit 63 illustrated in FIG. 3 is the partial connection state. In this case, the first switch circuit 63 electrically connects the first end 611a of the first unit coil 611 and the second end 612b of the second unit coil 612 to each other and electrically disconnects the first end 612a of the second unit coil 612 and the second end 613b of the third unit coil 613 from each other.

The first switch circuit 63 can electrically connect only the second unit coil 612 and the third unit coil 613 in series.

The full connection state is a state where all of the plurality of unit coils 611, 612, and 613 are electrically connected in series. The first switch circuit 63 in the full connection state electrically connects the first end 611a of the first unit coil 611 and the second end 612b of the second unit coil 612 to each other and further electrically connects the first end 612a of the second unit coil 612 and the second end 613b of the third unit coil 613 to each other.

The disconnection state is a state where all of the plurality of unit coils 611, 612, and 613 are electrically disconnected from one another. The first switch circuit 63 in the disconnection state electrically disconnects the first end 611a of the first unit coil 611 and the second end 612b of the second unit coil 612 from each other and further electrically disconnects the first end 612a of the second unit coil 612 and the second end 613b of the third unit coil 613 from each other.

The second switch circuit 64 selectively and electrically connects the first end 611a, 612a, or 613a of any one of the plurality of unit coils 611, 612, and 613 to the modulation/demodulation circuit 62 in accordance with a second control signal Sc2 inputted to the second switch circuit 64.

The state of the second switch circuit 64 illustrated in FIG. 3 is a state where the first end 612a of the second unit coil 612 is electrically connected to the modulation/demodulation circuit 62 and the first end 611a of the first unit coil 611 and the first end 613a of the third unit coil 613 are electrically disconnected from the modulation/demodulation circuit 62.

For example, the first switch circuit 63 and the second switch circuit 64 may be realized by a combination of multiple transistors.

In the present embodiment, the microprocessor 6z, which is mounted on the substrate 6x, outputs the first control signal Sc1 to the first switch circuit 63 through an I/O port 60. Similarly, the microprocessor 6z outputs the second control signal Sc2 to the second switch circuit 64 through the I/O port 60. The I/O port 60 is a signal input/output interface included in the microprocessor 6z.

When the microprocessor 6z outputs the first control signal Sc1 for bringing the first switch circuit 63 into the disconnection state, the microprocessor 6z outputs the second control signal Sc2 for bringing the second switch circuit 64 into a first high-order connection state described below. The first high-order connection state is a state where the first end 611a of the first unit coil 611, the second end 611b of which is grounded, is electrically connected to the modulation/demodulation circuit 62.

Meanwhile, when the microprocessor 6z outputs the first control signal Sc1 for bringing the first switch circuit 63 into the partial connection state or the full connection state, the microprocessor 6z outputs the second control signal Sc2 for bringing the second switch circuit 64 into a second high-order connection state or a third high-order connection state described below.

The second high-order connection state is a state where only the first end 612a of the second unit coil 612 is electrically connected to the modulation/demodulation circuit 62. The third high-order connection state is a state where only the first end 613a of the third unit coil 613 is electrically connected to the modulation/demodulation circuit 62.

In other words, the second high-order connection state and the third high-order connection state are each a state where only the first end 612a or 613a of the outermost unit coil 612 or 613 of a part or all connected in series, of the plurality of unit coils 611, 612, and 613, is electrically connected to the modulation/demodulation circuit 62.

In the following description, the part or all electrically connected to the modulation/demodulation circuit 62, of the plurality of unit coils 611, 612, and 613, are referred to as adopted antenna.

The adopted antenna is one of the plurality of unit coils 611, 612, and 613 or a plurality of unit coils electrically connected in series by the first switch circuit 63, of the plurality of unit coils 611, 612, and 613. In the present embodiment, the adopted antenna constantly includes the first unit coil 611, the second end 611b of which is grounded.

The modulation/demodulation circuit 62 performs the short-range wireless communication with the electronic tag 5a through the adopted antenna. That is, in a state where the supply unit 5 is mounted on the unit mounting portion 1a, the microprocessor 6z reads information from the electronic tag 5a and writes information to the electronic tag 5a by the short-range wireless communication through the modulation/demodulation circuit 62 and the adopted antenna.

The modulation/demodulation circuit 62 includes an RC circuit 62a. When the modulation/demodulation circuit 62 is electrically connected to the adopted antenna by the second switch circuit 64, the RC circuit 62a is electrically connected to the adopted antenna and forms an RLC circuit together with the adopted antenna.

Manual Setting Process

In order to set a combination of the first control signal Sc1 and the second control signal Sc2 to be outputted by the microprocessor 6z, the control portion 8 may execute a manual setting process described below.

In the manual setting process, the CPU of the control portion 8 causes the display portion 80b to display information about a plurality of predetermined setting candidates thereon, and selects one of the plurality of setting candidates in accordance with a selection operation on the operation portion 80a.

The plurality of setting candidates are information corresponding to a plurality of predetermined combinations of the first control signal Sc1 and the second control signal Sc2. The CPU of the control portion 8 records control designation information corresponding to the selected one of the plurality of setting candidates, in the secondary storage portion, which is not shown.

Furthermore, the CPU of the control portion 8 transmits the control designation information recorded in the secondary storage portion, to the microprocessor 6z of the antenna substrate 6. The microprocessor 6z outputs the first control signal Sc1 and the second control signal Sc2 in the combination represented by the control designation information, to the first switch circuit 63 and the second switch circuit 64.

For example, designation information indicating which of the plurality of setting candidates should be selected is recorded in an instruction manual or the like provided to a user together with a main body of the supply unit 5 or the supply unit 5. The user performs the above selection operation on the operation portion 80a according to the designation information.

Automatic Setting Process

In order to set a combination of the first control signal Sc1 and the second control signal Sc2 to be outputted by the microprocessor 6z, the microprocessor 6z may execute an automatic setting process described below.

In the automatic setting process, the microprocessor 6z sequentially outputs a plurality of pairs of trial control signals that are combinations of the first control signal Sc1 and the second control signal Sc2 having different contents, respectively, to the first switch circuit 63 and the second switch circuit 64.

Furthermore, the microprocessor 6z executes a trial communication process of attempting communication with the electronic tag 5a through the modulation/demodulation circuit 62, each time the microprocessor 6z outputs one pair of the trial control signals. The microprocessor 6z records control success information representing the trial control signals outputted when the communication with the electronic tag is successfully performed in the trial communication process, in a data storage unit that is not shown.

For example, the data storage unit may be the secondary storage portion of the control portion 8 or a storage unit such as a flash memory mounted on the antenna substrate 6. The data storage unit is a computer-readable non-volatile storage unit.

When the microprocessor 6z performs communication with the electronic tag 5a after end of the trial communication process, the microprocessor 6z outputs the first control signal Sc1 and the second control signal Sc2 in the combination represented by the control success information recorded in the data storage unit, to the first switch circuit 63 and the second switch circuit 64.

For example, when a predetermined detection sensor detects access to the supply unit 5, the manual setting process or the automatic setting process may be executed. The detection sensor may be a cover sensor that detects that a cover for the inlet of the unit mounting portion 1a is opened, or a unit sensor that detects that the supply unit 5 is detached from the unit mounting portion 1a.

In the antenna substrate 6, the winding number of the adopted antenna can be changed by changing the combination of the first control signal Sc1 and the second control signal Sc2. The winding numbers of the plurality of unit coils 611, 612, and 613 are determined by assuming a change in the specifications for the electronic tag 5a that can be adopted for the supply unit 5 in future.

Therefore, when the antenna substrate 6 is adopted, it is possible to change the combination of the first control signal Sc1 and the second control signal Sc2 if the specifications for the electronic tag 5a to be mounted to the supply unit 5 are changed. Accordingly, the microprocessor 6z can favorably perform the short-range wireless communication with the electronic tag 5a having new specifications. In this case, it is not necessary to replace components such as the antenna substrate 6.

Second Embodiment

Figure 4:
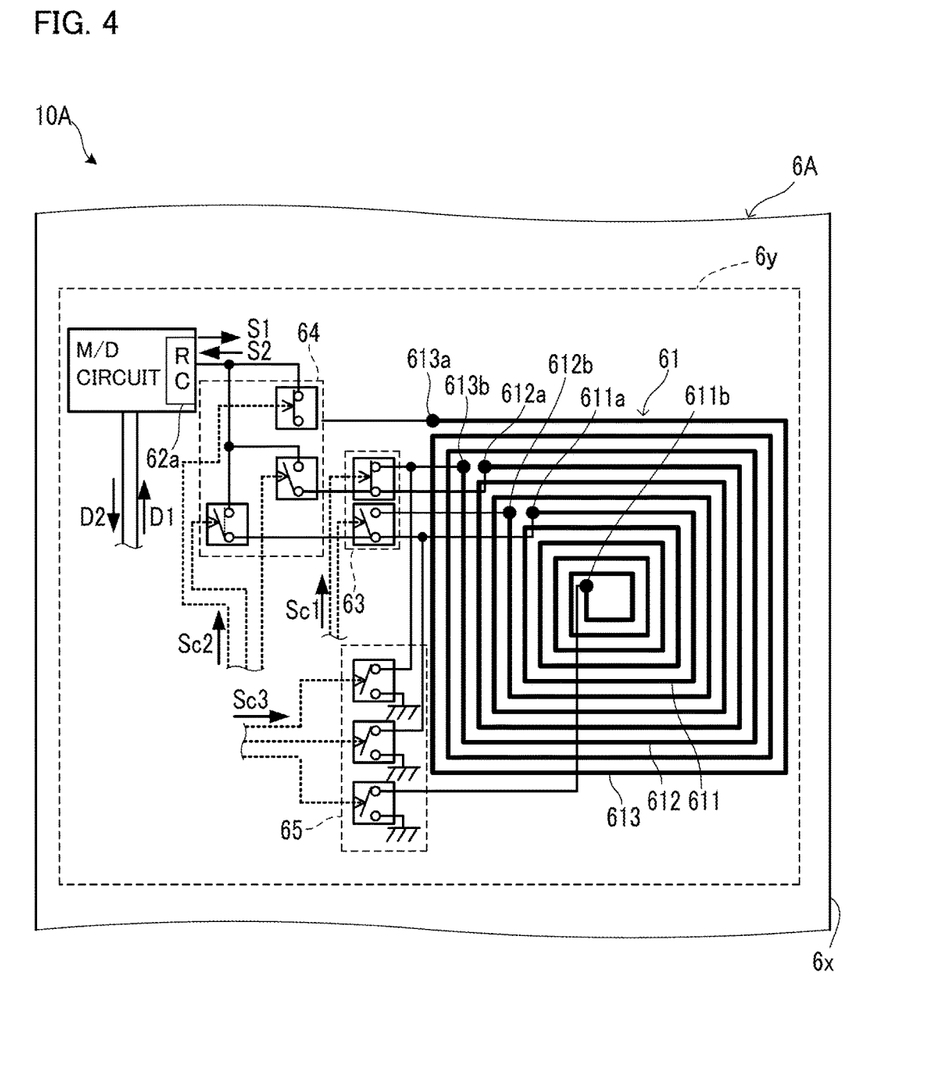
FIG. 4 is a configuration diagram of a tag communication circuit in an antenna substrate included in an image forming apparatus according to a second embodiment.

Next, an antenna substrate 6A included in an image forming apparatus 10A according to a second embodiment will be described with reference to FIG. 4. In FIG. 4, the same components as those shown in FIGS. 1 to 3 are designated by the same reference characters. Hereinafter, the difference of the antenna substrate 6A from the antenna substrate 6 will be described.

The antenna substrate 6A has a configuration in which a third switch circuit 65 is added to the antenna substrate 6 shown in FIG. 3. Each of a plurality of tag communication circuits 6y includes a third switch circuit 65. For example, the third switch circuit 65 may be realized by a combination of multiple transistors.

In each tag communication circuit 6y of the antenna substrate 6A, the second end 611b of the first unit coil 611 is not grounded in advance.

The third switch circuit 65 is mounted on the substrate 6x. The third switch circuit 65 selectively grounds the second end 611b, 612b, or 613b of any one of the plurality of unit coils 611, 612, and 613 in accordance with a third control signal Sc3 inputted to the third switch circuit 65.

In the present embodiment, the microprocessor 6z mounted on the substrate 6x outputs the third control signal Sc3 to the third switch circuit 65 through the I/O port 60.

In the present embodiment, one example of the partial connection state is a first partial connection state where only the first unit coil 611 and the second unit coil 612 are electrically connected in series. In this case, the microprocessor 6z outputs the third control signal Sc3 for bringing the third switch circuit 65 into a first ground state where only the second end 611b of the first unit coil 611 is grounded.

Furthermore, when the first switch circuit 63 is in the first partial connection state, the microprocessor 6z outputs the second control signal Sc2 for bringing the second switch circuit 64 into the second high-order connection state. As described above, the second high-order connection state is a state where only the first end 612a of the second unit coil 612 is electrically connected to the modulation/demodulation circuit 62.

In the present embodiment, another example of the partial connection state is a second partial connection state where only the second unit coil 612 and the third unit coil 613 are electrically connected in series. In this case, the microprocessor 6z outputs the third control signal Sc3 for bringing the third switch circuit 65 into a second ground state where only the second end 612b of the second unit coil 612 is grounded.

Furthermore, when the first switch circuit 63 is in the second partial connection state, the microprocessor 6z outputs the second control signal Sc2 for bringing the second switch circuit 64 into the third high-order connection state. As described above, the third high-order connection state is a state where only the first end 613a of the third unit coil 613 is electrically connected to the modulation/demodulation circuit 62.

In the present embodiment, when the first switch circuit 63 is in the disconnection state, the microprocessor 6z outputs the third control signal Sc3 for bringing the third switch circuit 65 into the first ground state, the second ground state, or a third ground state. The third ground state is a state where only the second end 613b of the third unit coil 613 is grounded.

When the first switch circuit 63 is in the disconnection state and the third switch circuit 65 is in the first ground state, the microprocessor 6z outputs the second control signal Sc2 for bringing the second switch circuit 64 into the first high-order connection state.

When the first switch circuit 63 is in the disconnection state and the third switch circuit 65 is in the second ground state, the microprocessor 6z outputs the second control signal Sc2 for bringing the second switch circuit 64 into the second high-order connection state.

When the first switch circuit 63 is in the disconnection state and the third switch circuit 65 is in the third ground state, the microprocessor 6z outputs the second control signal Sc2 for bringing the second switch circuit 64 into the third high-order connection state.

When the first switch circuit 63 is in the full connection state, the microprocessor 6z outputs the third control signal Sc3 for bringing the third switch circuit 65 into the first ground state. In this case, the microprocessor 6z outputs the second control signal Sc2 for bringing the second switch circuit 64 into the third high-order connection state.

When the present embodiment is adopted, the number of candidates for the combination of the plurality of unit coils 611, 612, and 613, that is, the number of candidates for the adopted antenna, becomes larger. Therefore, flexibility to handle a change in the specifications for the electronic tag 5a is further increased.

Third Embodiment

Figure 5:
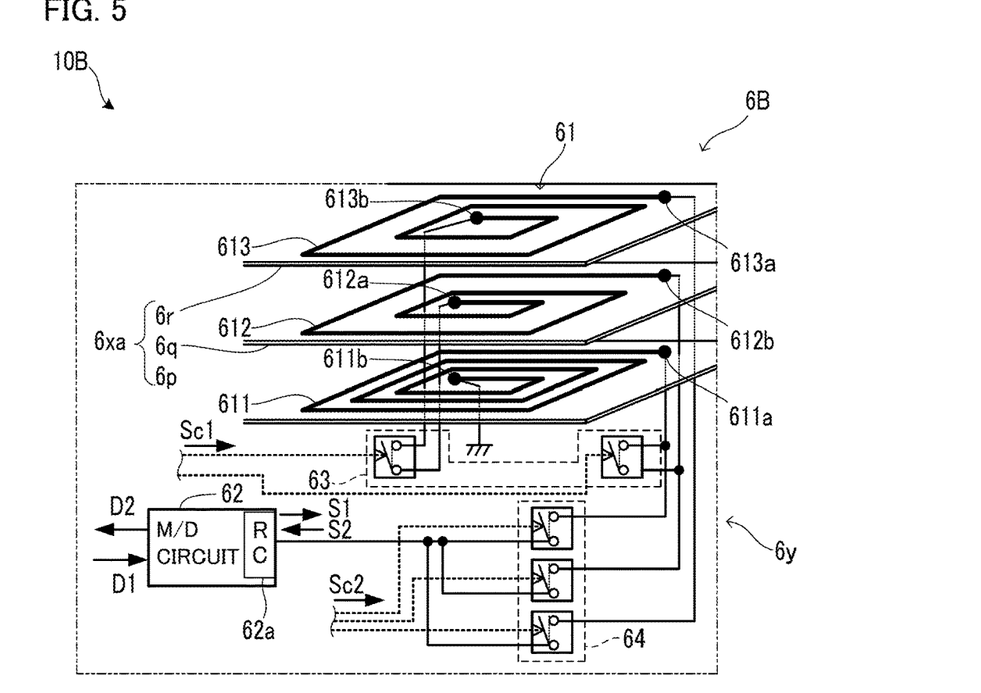
FIG. 5 is a configuration diagram of a tag communication circuit in an antenna substrate included in an image forming apparatus according to a third embodiment.

Next, an antenna substrate 6B included in an image forming apparatus 10B according to a third embodiment will be described with reference to FIG. 5. In FIG. 5, the same components as those shown in FIGS. 1 to 3 are designated by the same reference characters. Hereinafter, the difference of the antenna substrate 6B from the antenna substrate 6 will be described.

The antenna substrate 6B includes a multilayer substrate 6xa including a plurality of layers 6p, 6q, and 6r, instead of the substrate 6x. For the sake of convenience, in FIG. 5, the plurality of layers 6p, 6q, and 6r are shown in perspective views thereof so as to be spaced apart from each other.

Furthermore, for the sake of convenience, in FIG. 5, the modulation/demodulation circuit 62, the first switch circuit 63, and the second switch circuit 64 that are mounted on the multilayer substrate 6xa in reality are shown at positions away from the multilayer substrate 6xa.

In the present embodiment, the plurality of unit coils 611, 612, and 613 are concentrically formed in mutually overlapping regions in the plurality of layers 6p, 6q, and 6r.

In the present embodiment, the first end 611a and the second end 611b of the first unit coil 611 are the outer ends and the inner ends of the first unit coil 611, respectively. In addition, the first end 613a and the second end 613b of the third unit coil 613 are the outer end and the inner end of the third unit coil 613, respectively. These points are the same as in the antenna substrate 6.

Meanwhile, in the present embodiment, the first end 612a and the second end 612b of the second unit coil 612 are the inner end and the outer end of the second unit coil 612. This point is different from that in the antenna substrate 6.

Also when the antenna substrate 6B is adopted, the same advantageous effects as those in the case where the antenna substrate 6 is adopted are obtained. Furthermore, when the antenna substrate 6B is adopted, the area occupied by the printed antenna 61 can be reduced. As a result, the area of the antenna substrate 6B can be reduced.

First Application Example

Figure 6:
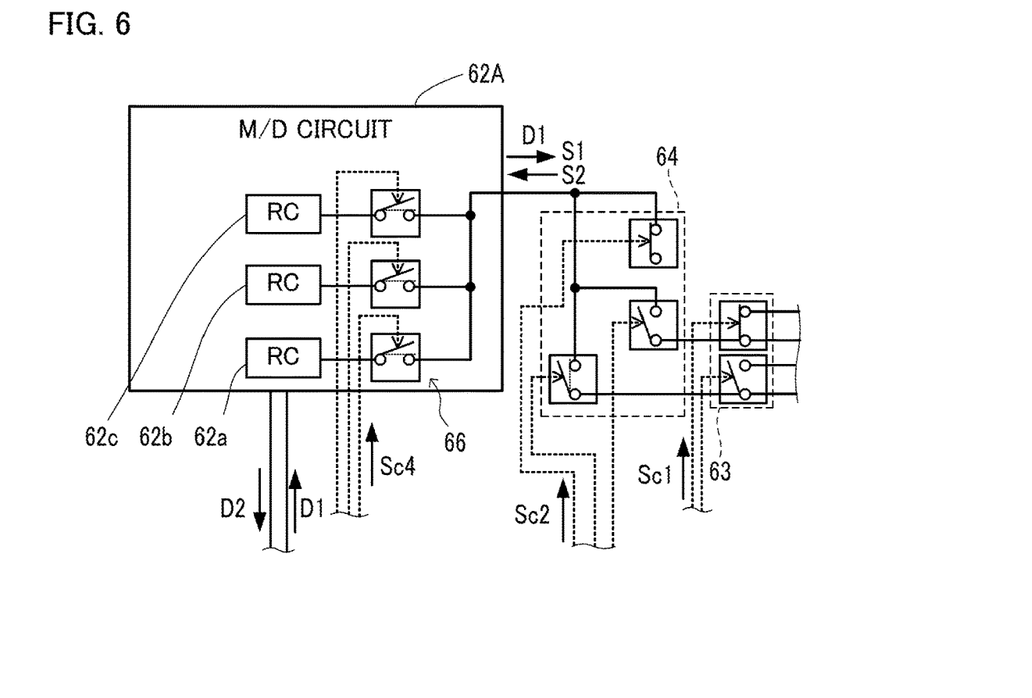
FIG. 6 is a configuration diagram of a modulation/demodulation circuit according to an application example.

Next, a modulation/demodulation circuit 62A according to a first application example will be described with reference to FIG. 6. The modulation/demodulation circuit 62A can be adopted in the antenna substrate 6, 6A, or 6B instead of the modulation/demodulation circuit 62.

The modulation/demodulation circuit 62A includes a plurality of RC circuits 62a, 62b, and 62c and a fourth switch circuit 66. For example, the number of the plurality of RC circuits 62a, 62b, and 62c may be equal to the number of the combinations of the first control signal Sc1 and the second control signal Sc2.

When each of the plurality of RC circuits 62a, 62b, and 62c is electrically connected to the adopted antenna of the printed antenna 61, each of the RC circuits 62a, 62b, and 62c forms an RLC circuit together with the adopted antenna. The adopted antenna is a part or all of the plurality of unit coils 611, 612, and 613.

The fourth switch circuit 66 selectively and electrically connects any one of the plurality of RC circuits 62a, 62b, and 62c to the adopted antenna in accordance with a fourth control signal Sc4 inputted to the fourth switch circuit 66.

For example, the fourth switch circuit 66 may be realized by a combination of multiple transistors.

In the present embodiment, the microprocessor 6z mounted on the substrate 6x outputs the fourth control signal Sc4 to the fourth switch circuit 66 through the I/O port 60.

The content of the fourth control signal Sc4 is predetermined for each combination of the plurality of unit coils 611, 612, and 613 to be connected as the adopted antenna to the modulation/demodulation circuit 62A. Therefore, the microprocessor 6z outputs the fourth control signal Sc4 corresponding to the combination of the first control signal Sc1 and the second control signal Sc2 to be outputted to the first switch circuit 63 and the second switch circuit 64.

When the modulation/demodulation circuit 62A is adopted, RLC circuits having higher degrees of freedom can be formed in the antenna substrate 6, 6A, or 6B in accordance with the specifications for the electronic tag 5a.

Second Application Example

The microprocessor 6z of the antenna substrate 6, 6A, or 6B may be omitted. In this case, the CPU of the control portion 8 provided independently of the antenna substrate 6, 6A, or 6B performs the processes that are performed by the microprocessor 6z of the antenna substrate 6, 6A, or 6B, instead of the microprocessor 6z.

Third Application Example

The antenna substrate 6B may include the third switch circuit 65 of the antenna substrate 6A. In addition, in the antenna substrate 6A or 6B, the number of the plurality of unit coils included in the printed antenna 61 may be two or may be four or more.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An antenna substrate comprising:
    a substrate;
    a modulation/demodulation circuit mounted on the substrate and configured to output and receive a communication signal to be used for short-range wireless communication with an electronic tag;
    a printed antenna printed on the substrate and configured to transmit and receive the communication signal as a radio wave;
    a first switch circuit mounted on the substrate; and
    a second switch circuit mounted on the substrate, wherein
    the printed antenna includes a plurality of unit coils that are each a metal foil printed in a coil shape on the substrate,
    the first switch circuit selectively switches to a state where a part or all of the plurality of unit coils are selectively and electrically connected in series, or a state where a part or all of the plurality of unit coils are electrically disconnected, in accordance with a first control signal inputted to the first switch circuit, and
    the second switch circuit selectively and electrically connects a first end of any one of the plurality of unit coils to the modulation/demodulation circuit in accordance with a second control signal inputted to the second switch circuit.

2. The antenna substrate according to claim 1, wherein the plurality of unit coils are concentrically formed along a series of coil-shaped lines so as to be arranged from an inner side to an outer side.

3. The antenna substrate according to claim 1, wherein
    the substrate is a multilayer substrate including a plurality of layers, and
    the plurality of unit coils are concentrically formed in mutually overlapping regions in the plurality of layers.

4. The antenna substrate according to claim 1, further comprising a third switch circuit configured to selectively ground a second end of any one of the plurality of unit coils in accordance with a third control signal inputted to the third switch circuit.

5. The antenna substrate according to claim 1, wherein the modulation/demodulation circuit includes:
    a plurality of RC circuits each configured to form an RLC circuit together with a part or all of the plurality of unit coils when being electrically connected to the printed antenna; and
    a fourth switch circuit configured to selectively and electrically connect any one of the plurality of RC circuits to a part or all of the plurality of unit coils in accordance with a fourth control signal inputted to the fourth switch circuit.

6. The antenna substrate according to claim 1, further comprising a processor mounted on the substrate and configured to output the first control signal and the second control signal to the first switch circuit and the second switch circuit of the antenna substrate.

7. The antenna substrate according to claim 6, wherein
the processor sequentially outputs a plurality of pairs of trial control signals that are combinations of the first control signal and the second control signal having different contents, respectively, and is capable of performing a trial communication process of attempting communication with the electronic tag through the modulation/demodulation circuit each time the processor outputs one pair of the trial control signals, and
the processor continuously outputs the trial control signals outputted when the communication with the electronic tag is successfully performed in the trial communication process, after end of the trial communication process.

8. An image forming apparatus comprising:
a unit mounting portion capable of mounting and detaching a supply unit containing a developer;
the antenna substrate according to claim 1 provided in corresponding relation to the unit mounting portion; and
a processor configured to output the first control signal and the second control signal to the first switch circuit and the second switch circuit of the antenna substrate, and read information from an electronic tag mounted on the supply unit that is mounted on the unit mounting portion, by the short-range wireless communication through the printed antenna of the antenna substrate.

9. The image forming apparatus according to claim 8, wherein
the processor sequentially outputs a plurality of pairs of trial control signals that are combinations of the first control signal and the second control signal having different contents, respectively, and is capable of performing a trial communication process of attempting communication with the electronic tag through the modulation/demodulation circuit each time the processor outputs one pair of the trial control signals, and
the processor outputs the trial control signals outputted when the communication with the electronic tag is successfully performed in the trial communication process, after end of the trial communication process.

* * * * *